United States Patent
Araki

(10) Patent No.: US 11,205,007 B2
(45) Date of Patent: Dec. 21, 2021

(54) METHOD FOR EXECUTING FALSIFICATION CHECK OF DATA TRANSMITTED FROM DATA RECORDING DEVICE INCLUDING PROCESSOR AND A/D CONVERTER, AND DATA RECORDING DEVICE FOR PERFORMING THE METHOD

(71) Applicant: ALAB INC., Tokyo (JP)

(72) Inventor: Masayuki Araki, Tokyo (JP)

(73) Assignee: ALAB INC., Tokyo (JP)

(*) Notice: Subject to any disclaimer, the term of this patent is extended or adjusted under 35 U.S.C. 154(b) by 43 days.

(21) Appl. No.: 16/866,386

(22) Filed: May 4, 2020

(65) Prior Publication Data

US 2020/0265148 A1 Aug. 20, 2020

Related U.S. Application Data

(63) Continuation-in-part of application No. PCT/JP2019/012577, filed on Mar. 25, 2019.

(30) Foreign Application Priority Data

Mar. 26, 2018 (JP) .............................. JP2018-058194

(51) Int. Cl.
    *G06F 21/60* (2013.01)
    *H04L 9/14* (2006.01)

(52) U.S. Cl.
    CPC .............. *G06F 21/602* (2013.01); *H04L 9/14* (2013.01)

(58) Field of Classification Search
    CPC ...... G06F 21/602; G06F 21/64; G06F 21/572; G06F 8/65; G06F 8/654; H04L 9/14;
    (Continued)

(56) References Cited

U.S. PATENT DOCUMENTS

2007/0036049 A1* 2/2007 Im ........................ G11B 31/003
                                                                369/47.16
2007/0106424 A1* 5/2007 Yoo ....................... H04L 63/102
                                                                700/245
(Continued)

FOREIGN PATENT DOCUMENTS

JP          H05277090 A      10/1993
JP          2009140609 A      6/2009
(Continued)

OTHER PUBLICATIONS

ISA Japanese Patent Office, International Search Report Issued in Application No. PCT/JP2019/012577, dated Jun. 18, 2019, WIPO, 2 pages.
(Continued)

*Primary Examiner* — Abiy Getachew
(74) *Attorney, Agent, or Firm* — McCoy Russell LLP

(57) ABSTRACT

A method for executing a falsification check of data transmitted from a data recording device including a processor and an A/D converter. The method includes Step Sa0 of preparing a public-secret key pair; Step Sa1 of inputting an analog signal obtained by a sensor into the A/D converter, while the A/D converter generates whole digital data consisting of signal data and noise data; Step Sa2 of computing a hash value for the signal data using a hash function; Step Sa3 of encrypting the hash value with either of the secret key or the public key; Step Sa4 of writing the encrypted hash value into a noise area where the noise data is recorded, Step Sb2 of authenticating the received data; and Step Sb4 of determining whether the data transmitted from the data recording device is falsified.

11 Claims, 5 Drawing Sheets

(58) Field of Classification Search
CPC ... H04L 9/0643; H04L 9/3247; H04L 9/3236; H04L 2209/60; H04L 2209/08; H04L 9/0836; H04L 9/3239; H04L 9/3263; H04L 2209/80; H04L 25/0202; H04L 25/0224; H04L 63/083; H04L 63/123; H04L 67/306; H04L 9/0858; H04L 9/0875; H04L 9/12; H04L 9/30; G09C 1/00; Y04S 40/20; G11B 2020/1224; G11B 2020/1229; G11B 20/00086; G11B 20/00094; G11B 20/00188; G11B 20/0021; G11B 20/00362; G11B 20/00753; G11B 20/10; G11B 27/034; G07C 2009/0092; G07C 9/0069; G07C 9/00896; G08B 13/06; G08B 13/08; H04K 1/00; H04N 1/32128; H04N 2101/00; H04N 2201/3225; H04N 2201/3236; H04N 2201/325; H04N 2201/3274; H04N 2201/3277; H04W 12/041; H04W 12/0431; H04W 12/06; H04W 12/068; H04W 12/069; H04W 12/128; H04W 12/35; H04W 12/71; H04W 4/021; H04W 88/02

See application file for complete search history.

(56) References Cited

U.S. PATENT DOCUMENTS

2009/0144831 A1* 6/2009 Un .................. H04L 9/3242
726/26
2013/0068930 A1* 3/2013 Nakamura ......... H04N 5/37455
250/208.1

FOREIGN PATENT DOCUMENTS

JP      201365969 A    4/2013
JP      2018005459 A   1/2018

OTHER PUBLICATIONS

Japanese Patent Office, Office Action Issued in Application No. 2019-549609, dated Nov. 26, 2019, 13 pages.

* cited by examiner

METHOD FOR EXECUTING FALSIFICATION CHECK OF DATA TRANSMITTED FROM DATA RECORDING DEVICE INCLUDING PROCESSOR AND A/D CONVERTER, AND DATA RECORDING DEVICE FOR PERFORMING THE METHOD

CROSS REFERENCE TO RELATED APPLICATIONS

The present application is a continuation-in-part of PCT/JP2019/012577 filed Mar. 25, 2019 and entitled "Data Provided with Hash and Method for Generating said Data." PCT/JP2019/012577 claims priority to Japanese Patent Application No. 2018-058194 filed on Mar. 26, 2018. The entire contents of the above-listed applications are hereby incorporated by reference for all purposes.

TECHNICAL FIELD

The present invention mainly relates to a method for generating data including a hash value.

BACKGROUND AND SUMMARY

Various sensors for measuring physical quantities, such as acceleration rate, speed, displacement, temperature, pressure, voltage, electric current, humidity, and pH, have been developed. Such a sensor obtains an analog signal, the analog signal is converted into digital data using an analog-to-digital (A/D) converter, and thus the converted data can be subjected to various digital processing, such as compression, storage, processing, and transmission.

A falsification verification technique of computing a hash value of a digital file recognized on a computer operating system, encrypting the hash value using a secret key (adding a digital signature), and authenticating the data by decrypting the encrypted hash value using a public key, which forms a pair with the secret key, is well known. (see Patent document 1)

CITATION LIST

Patent Literature

Patent document 1: Japanese Unexamined Patent Application Publication No. 2018-005459

Technical Problems

The physical quantity obtained by a sensor or the like is converted into digital data with an analog-to-digital (A/D) converter. However, the digital data (hereinafter referred to as "original data") may be mixed up, replaced with other data, or falsified during the subsequent digital processing. In such cases, it is difficult to identify or to investigate the cause.

To solve the above problem, it is an object of the present invention to provide a method for attaching a signature to the digital data that is converted by an A/D converter.

First Aspect

According to a first aspect of the present disclosure, provided is a falsification check method for executing a falsification check of data transmitted from a data recording device, which includes a processor and an A/D converter, and includes a first method performed by the data recording device and a second method performed by a user device.

The first method includes:
a. Step Sa0 of preparing a public-secret key pair,
b. Step Sa1 of inputting an analog signal obtained by a sensor into the A/D converter, while the A/D converter generates the digital data consisting of whole signal data and noise data that are determined according to S/N ratio (signal-noise ratio) of the data recording device, the signal data consisting of higher-order bits that are effectively used as significant data, the noise data consisting of lower-order bits that are disregarded, the higher-order bits stored in a signal area in the data recording device and the lower-order bits stored in a noise area (data region regarded as noise and unused) in the data recording device,
c. Step Sa2 of computing a hash value using a hash function for only the signal data of the digital data or for the whole digital data except the hash value,
d. Step Sa3 of encrypting the hash value with the secret key, and
e. Step Sa4 of writing the encrypted hash value into a noise area where the noise data is recorded, while the digital data including the encrypted hash value generated by performing the first method is transmitted to the user device.

The second method includes:
a. Step Sb2 of authenticating the received data by decrypting the encrypted hash value in the received data with the public key, and
b. Step Sb4 of determining whether the data transmitted from the data recording device has been falsified on the basis of a result in Step Sb2.

Second Aspect

According to a second aspect of the present disclosure, a falsification check method is for executing a falsification check of data transmitted from a data recording device, which includes a processor and an A/D converter, and includes a first method performed by the data recording device and a second method performed by a user device.

The first method includes:
a. Step Sa0 of preparing a public key,
b. Step Sa1 of inputting an analog signal obtained by a sensor into the A/D converter, while the A/D converter generates the digital data consisting of signal data and noise data that are determined according to S/N ratio (signal-noise ratio) of the data recording device, the signal data consisting of higher-order bits that are effectively used as significant data, the noise data consisting of lower-order bits that are disregarded, the higher-order bits being stored in a signal area in the data recording device and the lower-order bits being stored in a noise area (data region regarded as noise and unused) in the data recording device,
c. Step Sa2 of computing a hash value using a hash function for only the signal data of the digital data or for whole digital data except the hash value,
d. Step Sa3 of encrypting the hash value with the public key, and
e. Step Sa4 of writing the encrypted hash value into a noise area where the noise data is recorded, while the digital data including the encrypted hash value generated by performing the first method is transmitted to the user device.

The second method includes:
a. Step Sb1 of computing a hash value using the hash function for only the signal area of the received data or for whole received digital data except the hash value,
b. Step Sb2 of encrypting the hash value computed in Step Sb1 with the public key, and
c. Step Sb3 of comparing the encrypted hash value in the received data with the hash value encrypted in Step Sb2, and d. Step Sb4 of determining whether the digital data transmitted from the data recording device has been falsified on the basis of a result in Step Sb3.

According to the first and second aspects of the present invention, the digital data including the encrypted hash value obtained in such a way (digital data including a hash data) includes "signal data" and "hash value encrypted with the secret key or the public key." The digital data is transmitted from a data recording device, and then, a reception side (user device) checks whether the received digital data has been falsified. The data recording device computes a hash value of the digital data using a hash function, encrypts it with the secret key (the first aspect) or the public key (the second aspect), and transmits the encrypted hash value to the reception side. The reception side authenticates the received data by decrypting the received encrypted hash value with the public key (the first aspect) or compares the received encrypted hash value with the hash value computed and encrypted with the public key (the second aspect). In this way, it is determined whether the signal data consisting of the higher-order bits that are effectively used as significant data is determined has been falsified.

The meanings of the hash function and the hash value in this specification simply correspond to the technical terms. The hash function is an operation for obtaining a numerical value representing the received data or a function for obtaining such a numerical value, and the hash value is the numerical value obtained using the hash function. While representing authenticity of the data, the number of bits of the hash value also represents encryption strength of the data. For instance, the 4-bit hash (value) can be $2^4$ different values. In the other words, the data can have the same hash value as that of other data with a probability of 1 in16.

In the above method for generating data including a hash value, "data other than an encrypted hash value" can be included (recorded) in a part of the noise area. For instance, 24-bit digital data with a S/N ratio of 120 dB is composed of 20-bit signal data and 4-bit noise data per sample data. In this case, if the hash value is represented in 2 bits, data other than the hash value can be recorded. It means that the "hash value" and the "data other than the hash value" can be recorded in the noise area. In this case, not only the hash value is computed for "signal data" but also another hash value can be computed for both of the "signal data" and the "data other than the hash value in noise area." Since the latter hash value is computed for not only "signal data" but also the "data other than the hash value," it enables checking not only whether "signal data" but also if "data other than the hash value" has been falsified. The hash value computed in such a way is encrypted with the secret key and is written in the noise area (the noise area is overwritten).

In such a method, data for a plurality of samples among the digital data output from the A/D converter may be handled as a single data unit.

Easy hash function can shorten a calculation time and thus shorten a time required for embedding the hash value. This can also decrease a delay in data processing due to computing or encrypting the hash value, enabling the hash values to be embedded in real time.

However, when data for some predetermined time are handled as one unit or when a processor having low processing capacity is used, such real-time property is unnecessary and thus data for the plurality of samples can be processed as one unit. In this case, since the noise area for a plurality of samples is also available, the data amount capable of being stored in the noise area is to be increased.

Examples of the "data other than the hash value" include a time stamp showing an acquisition date and time of the original data, an identification ID for the original data, a code representing a hash function, a public key, and a conversion constant for obtaining the original data (simply referred to as to "conversion constant"), and optional data can be stored until the maximum storable amount is reached.

In the above, "conversion constant" means a numerical value showing a conversion multiplying factor between signal data and a physical quantity of an object measured. In other words, it means "a constant allowing a product of the conversion multiplying factor and a numerical value recorded in the signal data to be the physical quantity (finite value) measured by the sensor."

The conversion constant can be represented in some representations, for example, a fixed-point or floating-point representation, but the conversion constant is required to be represented by an integer or a finite decimal, that is, a rational number in any cases.

The signal data is binary data composed of sequences of "0" or "1" but can be represented in text format. On the other hand, the conversion constant is a specific numerical value determined according to a setting condition of an A/D converter. Accordingly, the use of "signal data represented in text format" and "conversion constant" enables the physical quantity obtained by the sensor to be computed.

First, a hash value of the data including both of "signal data" and "optional data" (the hash value for the whole data except the hash value) in the original data provided by the A/D converter is computed.

Second, the hash value is encrypted with a secret key.

Third, the noise area is overwritten with "optional data" and the "hash value."

The digital data is transmitted from a data recording device, and then, the reception side checks whether the received digital data has been falsified. The received data is authenticated by decrypting "hash value encrypted with the secret key" with the public key, which forms a pair with the secret key. When the hash value can be decrypted, the digital data is determined not to be falsified; otherwise, the digital data is determined to have been falsified. This determination point is the same as the above (in the case not including optional data).

The hash function and the public key need delivery to a user who uses data (who checks the data whether being falsified) in advance. The user cannot know the original hash value (the hash value that has not encrypted with the secret key) only using the hash function and the public key. However, the user can easily check whether the data has been falsified by authenticating the received data by decrypting the hash value encrypted with the secret key with the public key.

For data whose privacy is not required, the noise data is removed from the noise area of the original data, the hash value (and optional data if necessary) is recorded in the noise area, the digital data including the noise area where the hash value is recorded is recorded as text data, and the (text) data (possibly compressed) is transmitted. The user who uses the data can check the data whether being falsified.

In this case, the data determined not to be falsified (authenticated data) has greater flexibility to be processed than the binary data output from the A/D converter.

According to any aspect of the present invention, the hash value is contained in the noise area (data region regarded as noise and unused), and thus, it is easily determined that the original data is not falsified. Additionally, the necessary number of bits for representing the hash value is small, and thus, information other than the hash value can also be embedded. In this case, not only the digital data in higher-order bits that is utilized as a signal but also information embedded in the non-data area except the hash value can be checked whether being falsified.

DETAILED DESCRIPTION

Embodiments

Embodiments of the present invention will be described below with reference to the drawings. However, each embodiment should be interpreted in a purposive way to understand technical ideas of the present invention and should not be interpreted so as to limit the gist of the invention.

In a first embodiment, a basic idea of the present invention and principles of the solution of problems will be described, and in a second embodiment, more practical method for using it will be described.

First Embodiment

An analog signal, which is obtained by a sensor, is converted into digital data (original data). The digital data immediately after the conversion includes not only the signal but also data regarded as noise and disregarded. When the digital data is used, the above noise data is disregarded.

The first embodiment of the present invention is to replace the noise data to be disregarded with "meaningful data" and to provide a new technique to utilize the "meaningful data."

First, a data recording device according to the first embodiment will be described.

Figure 5:
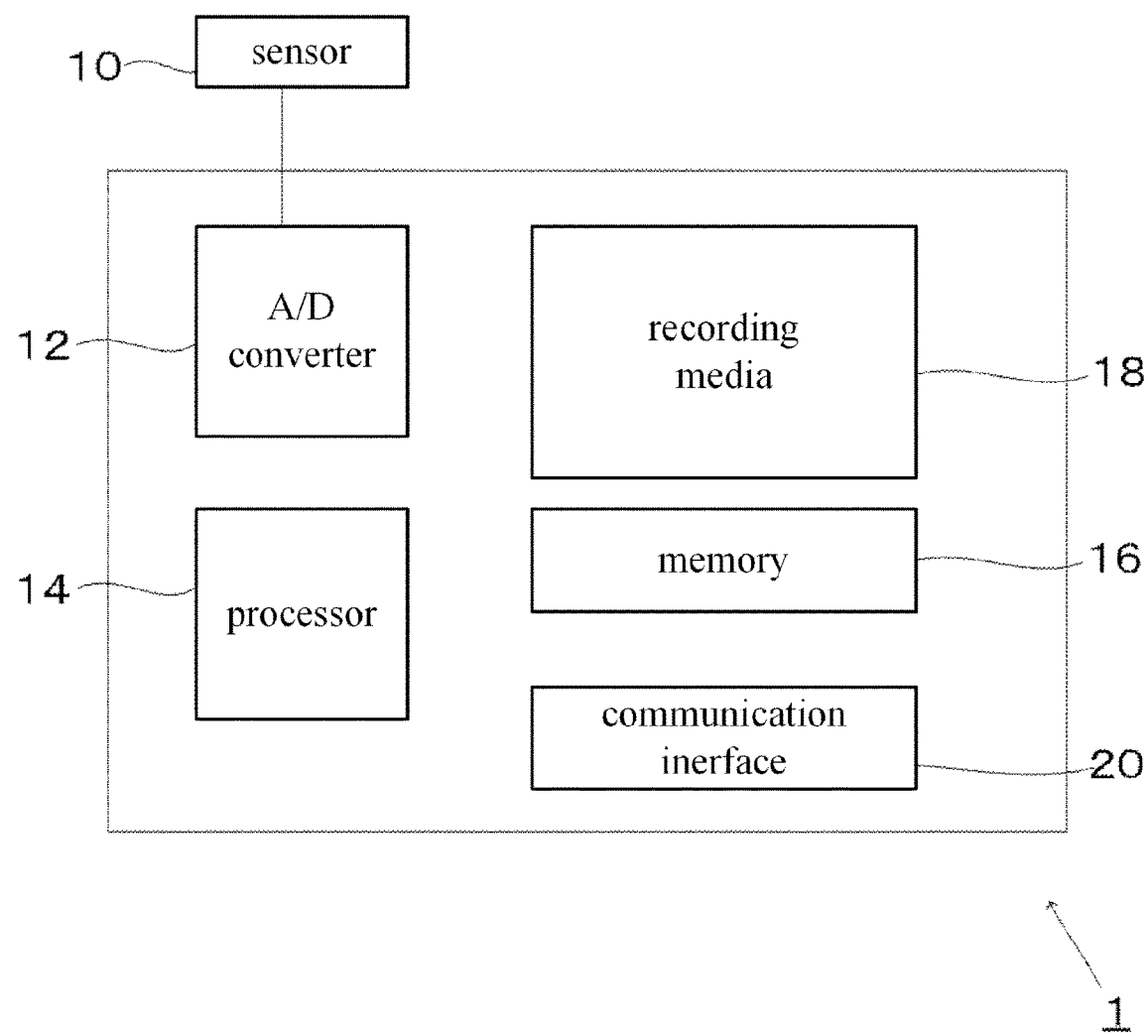
FIG. 5 shows a hardware configuration of a data recording device according to embodiments of the present invention.

As shown in FIG. 5, the data recording device (data logger) 1 includes a sensor 10, an A/D converter 12, and a processor 14. The sensor can process a physical quantity of an object to be measured, for example, the sensor can convert the change in the physical quantity into a voltage change and can transmit the change to the A/D converter, is adopted as the sensor 10.

The A/D converter 12 is a device for converting analog data into digital data, and its performance varies depending on the sampling frequency or the number of bits. However, the A/D converter 12 is not limited to a particular A/D converter. The processor 14 is a device for controlling the data recording device and executing a numerical calculation or the like. The processor applied as the processor 14 can be various types of processors from a 4-bit or 8-bit microcomputer to a 64-bit high-performance processor mounted on a recent general purpose computer or a server. The number of bits and the clock frequency of the processor 14 can affect a computing speed and an encryption speed for the hash value that will be described. However, the processor 14 is not limited to a particular processor. Additionally, the data recording device 1 can include necessary hardware configurations, such as a memory 16, a hard disk or recording media 18, and a communication interface 20.

The data recording device need not be an integrated device. A sensor section may be separated from a data processing section (a processor, an A/D converter, or the like), that is, all sections except the sensor section, or the A/D converter and the processor may be integrated.

Figure 2:
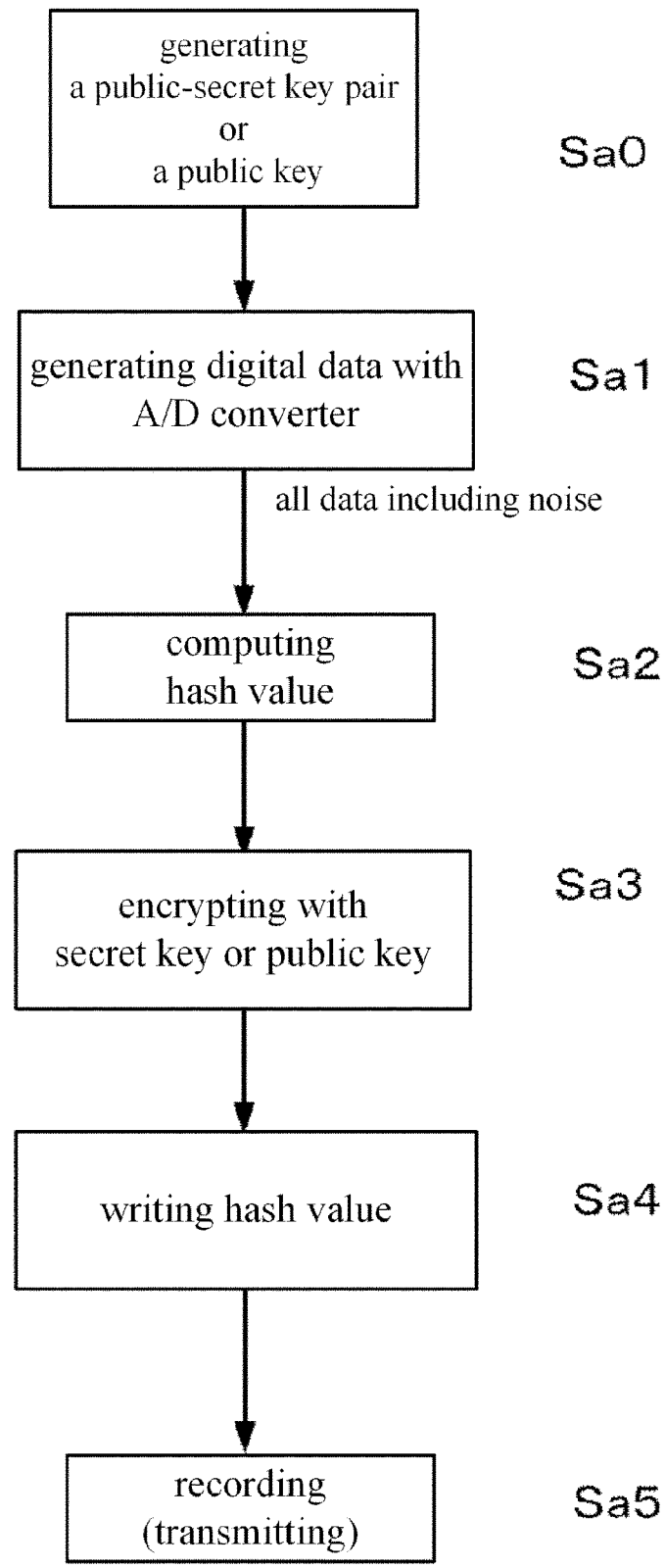
FIG. 2 is a flowchart for generating data including a hash value and shows a processing flow on a data recording device side.
Figure 3:
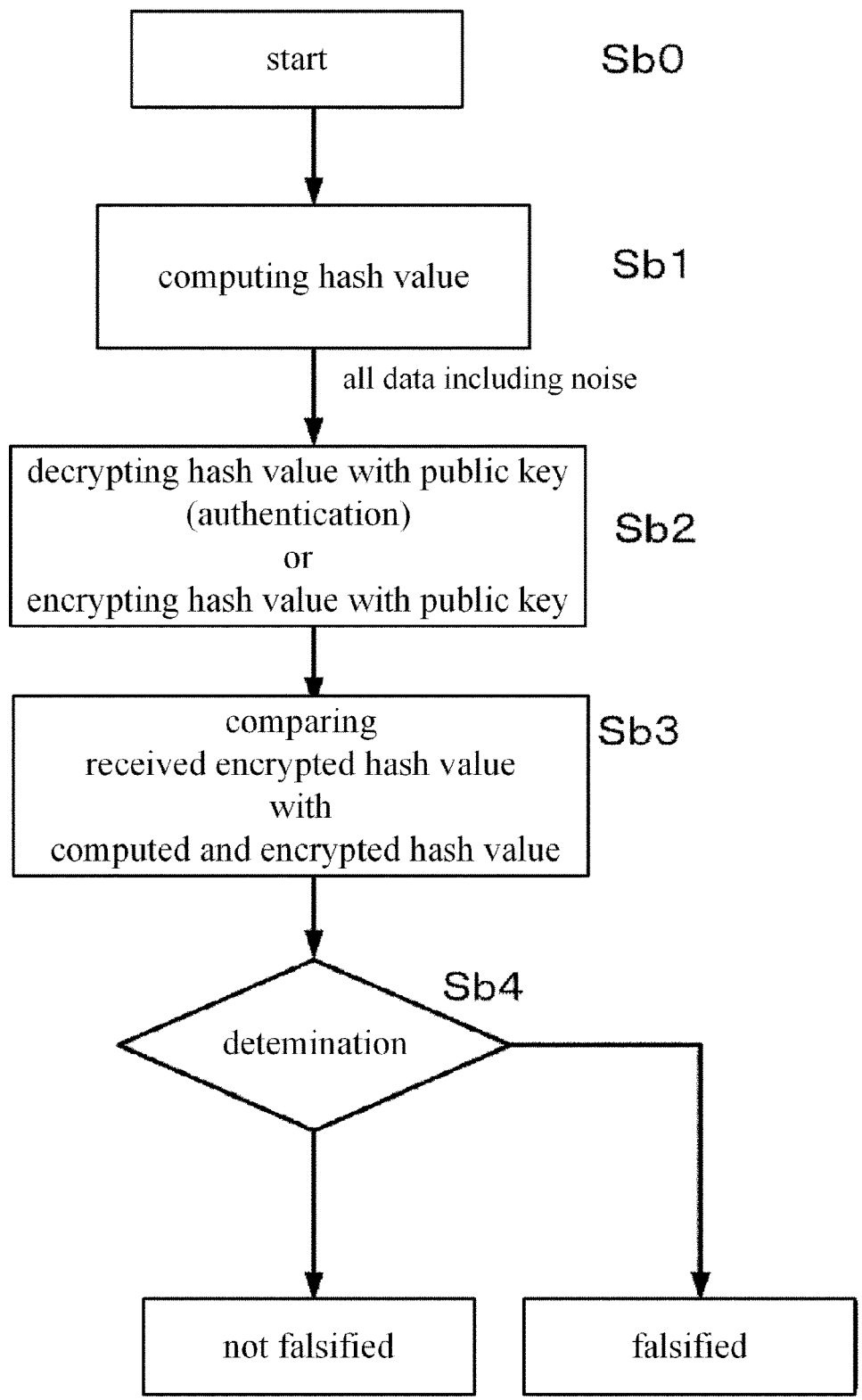
FIG. 3 is a flowchart for detecting a falsification of data and shows a processing flow on a user side who uses the data.

In some embodiments, a system such as one or more of the systems of FIG. 5 may comprise means for performing the various actions and/or operations of the methods of FIGS. 2 and 3.

Figure 1A:
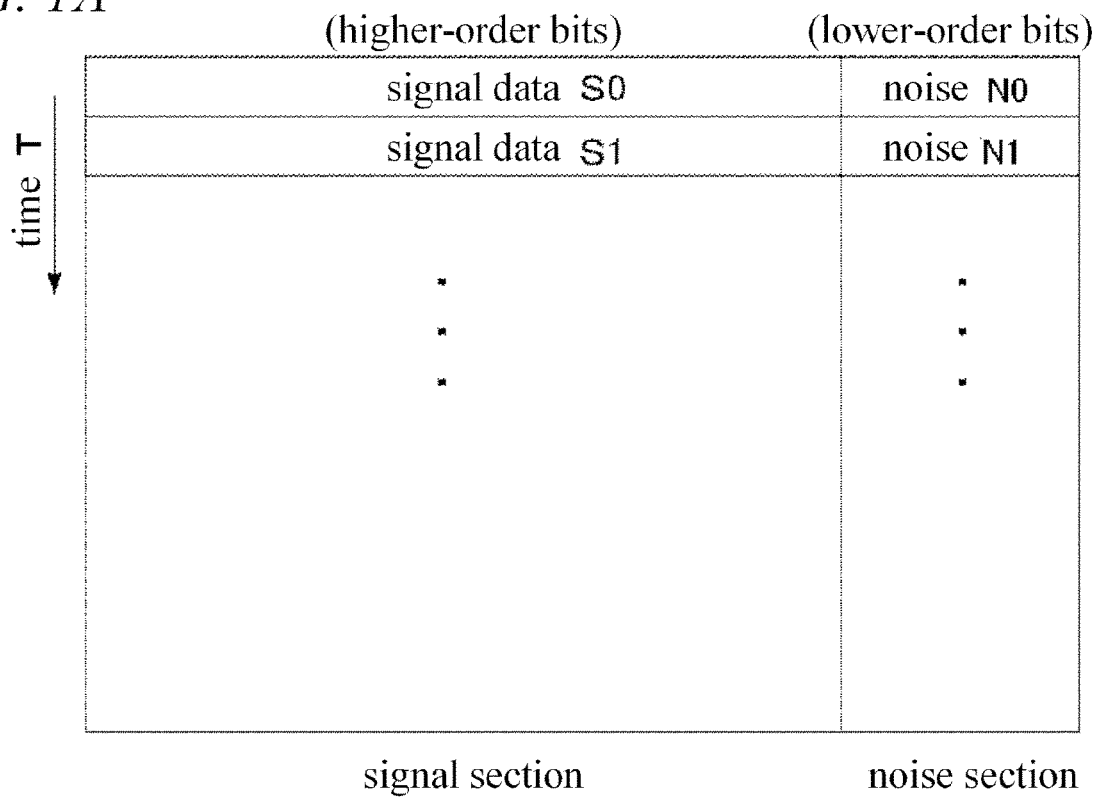
FIG. 1A is a conceptual diagram of a data constitution of original data output from an A/D converter, and the original data are arranged in time series.

FIG. 1A is a conceptual diagram of a data constitution of original data output from an A/D converter, and the original data arranged in time series. As shown in FIG. 1A, the original data at clock time t=0 contains signal data S0 in the high-order bits and noise data N0 in the lower-order bits, and the original data at clock time t=1 contains signal data S1 in the high-order bits and noise data N1 in the lower-order bits. The data quantity varies depending on a sampling frequency or the number of bits of the A/D converter. For instance, the A/D converter outputs 24-bit data every 100 msec for 24-bit digital data with a sampling rate of 100 msec and S/N ratio of 120 dB.

To guarantee authenticity of signal data contained in the original data, the hash value for the signal data is computed. In computing the hash values, a hash table can be previously prepared, or a checksum or known hash functions, such as, CRC16, MD5, SHA1, SHA2, and SHA3, can be used. The number of bits of the hash value depends on the hash function. For example, the number of bits is 128 using SHA2, 64 using MD5, and 16 using CRC. The hash value is 128-bit encrypted data when SHA2 is used, and thus, the data can have the same hash value as that of other data with a probability of 1 in $340\times10^{28}$. Such an encrypted data would be very strong.

The hash value computed in this way is stored in the noise area, and it allows the hash value to be used for authenticating the data. In particular, a public-secret key pair is prepared by a known method in advance, the hash value is encrypted with the secret key, and the encrypted hash value is written in the noise area.

Although it is described below (in the variation), the hash value encrypted with the public key instead of the secret key may be written in the noise area. This is also applied to a second embodiment.

Figure 1B:
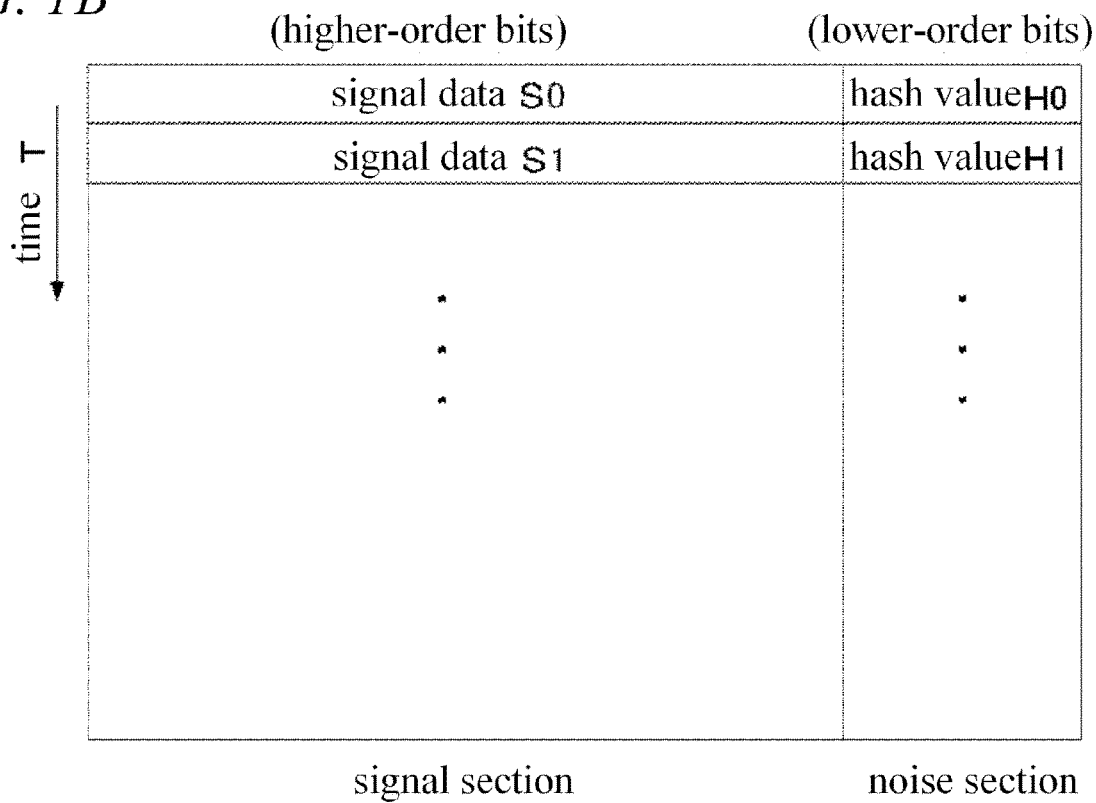
FIG. 1B is the same conceptual diagram as that in FIG. 1A, and hash values are written in lower-order bits in the original data where noise data were being recorded.

FIGS. 1A and 1B are conceptual diagrams. In FIG. 1B, the lower-order bits, where the noise data was recorded in FIG. 1A, are overwritten with the encrypted hash values. As shown in FIG. 1B, the noise area is overwritten with the encrypted hash value H0 for the signal data S0 and then, overwritten with the encrypted hash value H1 for the signal data S1 in the same way.

Method for Generating Data Including Hash Value

FIG. 2 is a flowchart for generating data including a hash value and shows a processing flow on a data recording device side.

First, a public-secret key pair is prepared at a preparing stage (Step Sa0). When the processor with low processing capacity is used, the key pair may be prepared using another processor.

Then, the A/D converter generates digital data from an analog signal obtained by the sensor. The whole digital data consists of signal data and noise data (Step Sa1). This digital data consists of the signal data and the noise data as described referring to FIG. 1A.

Next, the processor computes a hash value for the signal data using a hash function (Step Sa2).

Next, the obtained hash value is encrypted with the secret key that was prepared at Step Sa0 (Step Sa3).

Next, the noise area where the noise data is recorded is overwritten with the hash value encrypted at Step Sa3 (Step Sa4). At this writing Step Sa4, the hash area is overwritten with "zero" (cleared to zero) in advance, and then, the encrypted hash value is written in the area. Because the noise area includes numerical values (noise data), the noise area is cleared to zero. Since the value "zero" is typically used to clear areas, examples that the area is cleared to "zero" will be described below. However, any other known values can also be used for clearing areas.

After that, the generated data including the encrypted hash value is stored in (transmitted to) a recording medium as needed (step Sa5).

Method for Checking Falsification

An operation on a user side who received data including the encrypted hash value will be described.

FIG. 3 is a flowchart for detecting a falsification of the data and shows a processing flow on the user side who received the data including the encrypted hash value.

First, the flowchart starts from a stage where the user side has received the data including the encrypted hash value, as a premise condition (Step Sb0).

The digital signature is authenticated by decrypting the hash value encrypted with the secret key with the public key, which forms a pair with the secret key. (Step Sb2) The authenticated digital signature shows that the hash value is not falsified, and it is determined that the signal data consisting of higher-order bits that are effectively used as significant data is not falsified. (Step Sb4)

Step Sb1 and Step Sb3 in FIG. 3 are performed by a side who receives data when the hash value is encrypted with a public key in "Method for generating Data including Hash value" as described above in reference to FIG. 2.

In this way, the hash value, that is, a marker, is included in the noise area in the digital data obtained by the sensor (the original data), and thus, it enables more easily determining the data whether being falsified. Such a noise area occupies a part of the data region but is in an area that is not actually used (non-data area).

Furthermore, any information is not written into the signal area where data in the original data is effectively used. Even if a hash value or any other additional information is embedded into any part of the original data, such a part is always the noise area in the original data, and thus, this configuration is advantageous that the data is not practically damaged.

Second Embodiment

The first embodiment shows the example where a hash value is embedded in every sample. With this method, the higher the sampling frequency is or the lower the processing speed of the processor is, the larger the delay required for computing or encrypting the hash value. Additionally, when the number of bits in the noise area cannot be secured, for example, when the number of bits of the A/D converter is small or the S/N ratio is high, an easy hash function should be used.

A method for dividing the data for a certain time as unit time will be now described instead of embedding a hash value into every sample.

For instance, when the real time data has 4-bit noise area and its sampling rate is 100 samples/sec, it is calculated that the data amount of 4 bits×100 per second (400 bits/sec) can be stored. In this case, when CRC16 (16 bits) is used to compute a hash value, the value can be $2^{16}$ (about 65,000) different values. The data can have the same hash value as that of other data with a probability of 1 in $2^{16}$.

Figure 4:
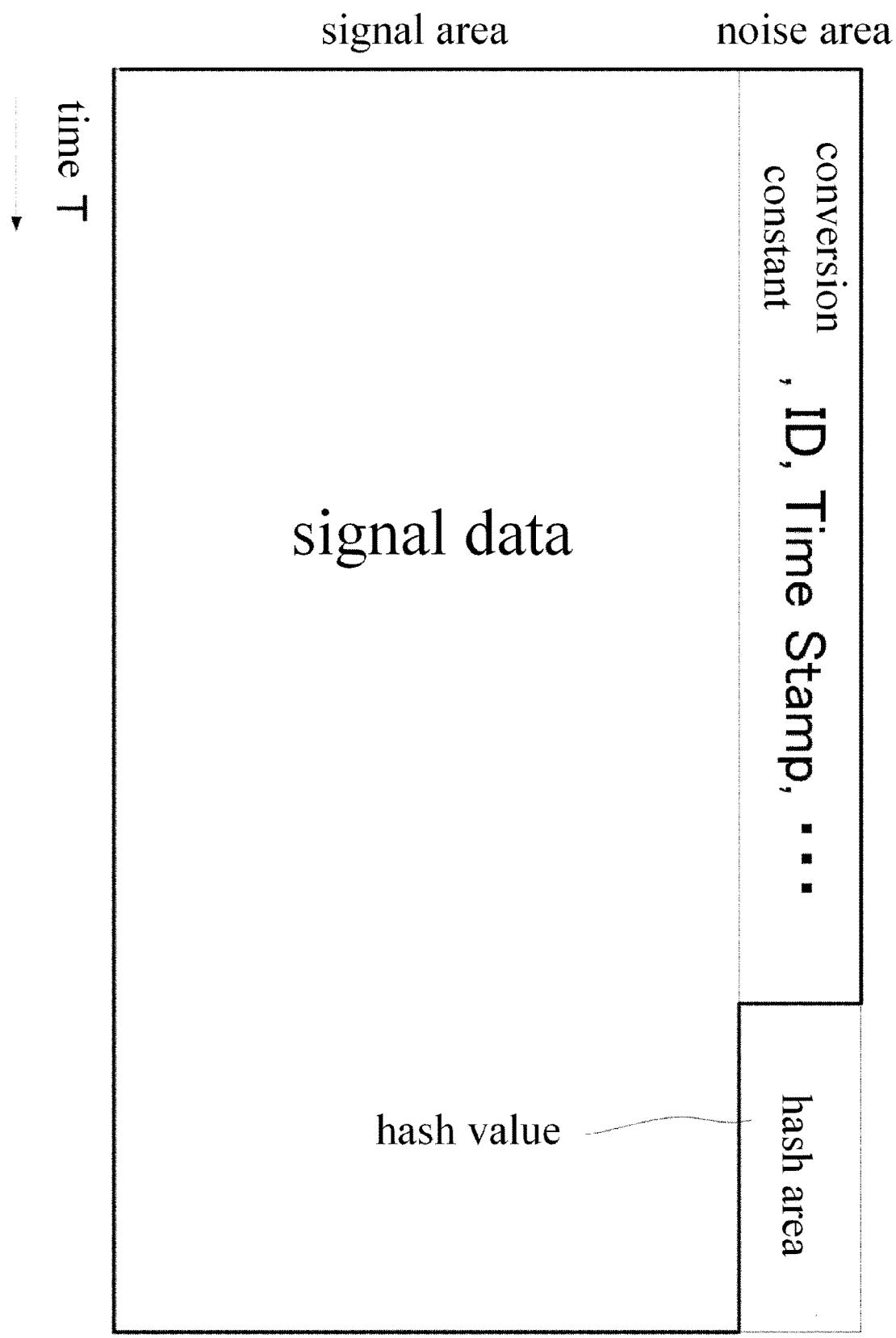
FIG. 4 shows data including a hash value to be generated per unit time.

FIG. 4 is a conceptual diagram showing original data generated per unit time, and the original data is divided into "signal area" and "noise area". In FIG. 4, data for a plurality of samples are collected, and the noise area for the plurality of samples can be used, leading to a larger area where "additional information" can be embedded. In the above, examples of the "additional information" include information useful for identifying digital data, and the "additional information" is "data other than the hash value" and preferably enhances authenticity of the original data.

Examples of the "data other than the hash value" include a time stamp showing an acquisition date and time of the original data, an identification ID for the original data, a code representing a hash function, a public key, and a conversion constant for obtaining the original data (simply referred as to "conversion constant"), and the optional data can be stored until the maximum storable amount.

In the above, "conversion constant" means a numerical value showing a conversion multiplying factor between the signal data and a physical quantity of an object measured. In other words, it means "a constant enabling a product of the conversion multiplying factor and a numerical value recorded in the signal data to be the physical quantity (finite value) measured by the sensor."

For example, when 1-bit digital data shows the physical quantity at 0.05 V, the conversion constant is 0.05.

When the conversion constant is embedded into a part of the noise area, the conversion constant can be represented in some representations, for example, a fixed-point or floating-point representation, but the conversion constant is represented by an integer or a finite decimal, that is, a rational number in any case. A circulating decimal (0.123123123 . . . ) or an infinite decimal (0.03333 . . . ) must not be used.

The above reason will be now described using another example.

In one example, an A/D converter provides a physical quantity at 3.333 V, and signal data after the A/D conversion, which is effectively used as significant data (lower-order bits are regarded as noise and unused), is "10" (represented by "A" in hexadecimal). In this case, if it is defined that a conversion constant is "0.3333" and that the corresponding physical quantity is to be a product of the digital data (signal data) and the conversion constant (10×0.3333), the definition allows the digital data excluding noise to be surely represented by text data "3.333." The text data "3.333" and the conversion constant "0.3333" obtained enable a value of the digital data (signal data) value "10" to be computed.

Alternatively, the digital data (signal data) value can be theoretically computed by dividing the physical quantity by the conversion constant. However, the above method does not hold the correspondence relation between the digital data and the text data and is not allowed accordingly.

If the digital data value that is effectively used as significant data is "10" as above, the corresponding physical quantity is computed by dividing the digital data value "10" by the conversion constant "3" and is represented by an infinite decimal such as "3.333333 . . . ." In this case, the infinite decimal needs to be controlled, for example, truncated or rounded according to a certain finite position, and then, it does not enable the rigorous correspondence relation to be held. (e.g. "3.333" multiplied by the conversion constant "3" is "9.999" and is different from the digital data value "10".)

In this sense, it is important that the value of "physical quantity" is represented by a product of "signal data recorded in the signal area" and "conversion constant" but not "the result of the division". The detail of the conversion constant usage will be further described below.

The "signal data" recorded in the signal area corresponds to binary data composed of a sequence of "0" or "1" (in the above example, 20-bit sequence of "0"/"1"). This binary data can be read out and converted into text data. Additionally, this binary data can also be converted into a format that can be easily processed, such as into hexadecimal, as needed. On the other hand, the conversion constant is a specific numerical value determined according to a setting condition of an A/D converter. Accordingly, the use of "signal data represented in text format" and "conversion constant" enables the physical quantity measured by the sensor to be computed.

The digital data generated by the A/D converter is stored in various data formats, and thus the digital data is usually not text data. In the case where the digital data is not in text format, such digital data needs to be processed using the appropriate operating system or a specific program. This configuration does not have high general versatility in the above point. According to embodiments of the present invention, the signal data included in the original data is, however, represented in text format or the like, and thus, the signal data in text format or spreadsheet software format can be delivered to users together with the conversion constant, other optional information, and the encrypted hash value.

The user side can restore the binary data from the text data and the conversion constant.

Such a configuration allows "data including a hash value" to be delivered in text format and additionally enables the user to check whether the data the data has been falsified.

The above is described about invertible conversion data "text data" that is most easily processed, but any inversely convertible data format is available. Furthermore, the data processing side can use an existing system, and the existing system needs no additional component or alteration, not affecting its operation at all. In the other word, it produces no disadvantage to employ on the existing system the method for embedding a hash value in data according to embodiments of the present invention, and the degree of authenticity of data can be enhanced up to optional encryption strength without increasing the operation cost at all.

Other Embodiment

Assuming a method for attaching an electronic signature to (digital) data output from an A/D converter, it is described that the hash value encrypted with the secret key (digital signature) is embedded into the "noise area" including noise in the digital data and the encrypted hash value is authenticated on the reception side. However, the hash value encrypted with the secret key can be embedded in the non-data area of any other digital data, when such digital data includes a data area consisting of higher-order bits that is effectively used as significant data and a non-data area consisting of lower-order bits that is disregarded. Other additional information, such as an identification ID and a conversion constant, can also be embedded in such a non-data area as needed.

The above embodiments are described assuming that the "secret key" is used as an encryption key (signature key) on the data recording device side. If "secret key" is, however, replaced with "public key" for the encryption key of the data recording device, the configuration without the secret key is also available. In this case, the secret key prepared in Step Sa0 is used only for "generating a public key", and then, the secret key to be used in the subsequent steps can be replaced with the public key. While the hash function and the public key need delivery to a user side, the data recording device side does not need to hold the secret key when a common key (e.g. public key) between the transmission and reception sides is used.

A falsification check method using the public key will be described below.

Falsification Check Method

Next, steps performed by a user device which receives data including hash value will be described.

FIG. 3 is a flowchart for steps where a user device detects a falsification of data.

First, the flowchart starts from a stage where the user device has received the data including the hash value, as a premise condition. (Step Sb0)

The user device computes another hash value for the whole data except a hash area which consists of the hash value encrypted with a public key. (Step Sb1) In this computing, the same hash function as that used when the data including hash value was computed is used.

Next, the hash value computed in Step Sb1 is encrypted with the public key. (Step Sb2)

Next, the hash value in the received data (hash value encrypted with the public key) is compared with the hash value computed in Step Sb1 and encrypted in Step Sb2. (Step Sb3)

Finally, it is determined whether the received data has been falsified (Step Sb4).

In particular, a difference between hash values compared is computed. When the difference is zero, the received data is determined not to be falsified because the compared hash values are determined to match each other; otherwise, the digital data is determined to have been falsified because the compared hash values are determined not to match each other.

INDUSTRIAL APPLICABILITY

As described in the first and second embodiments, "data including a hash value" is the data where the hash value and other data in text format are embedded in a non-data area, which has been regarded as a noise and has not been used in the past, and the data is not damaged accordingly. Consequently, this configuration is also available on the current system without any alterations.

The methods and routines disclosed herein may be stored as executable instructions in non-transitory memory and may be carried out by a processor in combination with the various sensors and other hardware. The executable instructions may be instructions for implementing logical functions (that is, "logic" that may be implemented either in digital form such as digital circuitry or source code or in analog form such as analog circuitry or an analog source such as an analog electrical signal), and may selectively be embodied in any computer-readable medium for use by or in connection with an instruction execution system, apparatus, or device. The computer readable medium may selectively be, for example, but is not limited to, an electronic, magnetic, optical, electromagnetic, infrared, or semiconductor system, apparatus or device.

In some embodiments, memory may store machine readable storage media which may have executable instructions that, when executed, cause one or more processors to perform an operation comprising the methods of FIGS. 2 and 3. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the disclosed system, where the described actions are carried out by executing the instructions in a system including the various hardware components in combination with the processor.

The invention claimed is:

1. A method for executing a falsification check of data transmitted from a data recording device, the data recording device comprising a processor and an A/D converter, the method comprising a first method performed by the data recording device and a second method performed by a user device, wherein the first method comprises:
Step Sa 0 of preparing a public-secret key pair;
Step Sa1 of inputting an analog signal obtained by a sensor into the A/D converter, while the A/D converter generates whole digital data consisting of signal data and noise data that are determined according to S/N ratio of the data recording device,
wherein the signal data consists of higher-order bits that are effectively used as significant data, and the noise data consists of lower-order bits that are disregarded,
the higher-order bits are stored in a signal area in the data recording device and the lower-order bits are stored in a noise area in the data recording device, the noise area being a data region regarded as noise and unused,
Step Sa2 of computing a hash value using a hash function for only the signal data of the whole digital data or for the whole digital data except the hash value;
Step Sa3 of encrypting the hash value with a secret key of the public-secret key pair; and
Step Sa4 of writing the encrypted hash value into the noise area where the noise data is recorded, while the digital data including the encrypted hash value generated by performing the first method is transmitted to the user device, and wherein the second method comprises:
Step Sb2 of authenticating the data received by the user device by decrypting the encrypted hash value in the data by the user device with a public key of the public-secret key pair; and
Step Sb4 of determining whether the data transmitted from the data recording device has been falsified on a basis of a result in Step Sb2.

2. A method for executing a falsification check of data transmitted from a data recording device, the data recording device comprising a processor and an A/D converter, the method comprising a first method performed by the data recording device and a second method performed by a user device:

wherein the first method comprises:
Step Sa 0 of preparing a public key;
Step Sa1 of inputting an analog signal obtained by a sensor into the A/D converter, while the A/D converter generates whole digital data consisting of signal data and noise data that are determined according to S/N ratio of the data recording device,
wherein the signal data consists of higher-order bits that are effectively used as significant data and the noise data consists of lower-order bits that are disregarded, and
wherein the higher-order bits are stored in a signal area in the data recording device and the lower-order bits are stored in a noise area in the data recording device, the noise area being a data region regarded as noise and unused,
Step Sa2 of computing a hash value using a hash function for only the signal data or for the whole digital data except the hash value;
Step Sa3 of encrypting the hash value with the public key; and
Step Sa4 of writing the encrypted hash value into the noise area where the noise data is recorded, while the digital data including the encrypted hash value generated by performing the first method is transmitted to the user device, and wherein the second method comprises:
Step Sb1 of computing a hash value using the hash function for only the signal area of the whole digital data received by the user device or for the whole digital data received by the user device except the hash value;
Step Sb2 of encrypting the hash value computed in Step Sb1 with the public key;
Step Sb3 of comparing the encrypted hash value in the received data with the hash value decrypted in Step Sb2; and
Step Sb4 of determining whether the data transmitted from the data recording device has been falsified on a basis of a result in Step Sb3.

3. The method for executing the falsification check of data according to claim 1, wherein data other than the encrypted hash value is included in a part of the noise area.

4. The method for executing the falsification check of data according to claim 1, wherein data for a plurality of samples among the whole digital data output from the A/D converter is handled as one data unit.

5. The method for executing the falsification check of data according to claim 1, wherein the data other than the encrypted hash value includes a conversion constant between the signal data and a physical quantity represented by the analog signal obtained by the sensor.

6. The method for executing the falsification check of data according to claim 4, wherein the data other than the encrypted hash value includes at least one of a time stamp, an identification ID, a code representing a hash function, and a public key.

7. The data recording device for performing the method for executing the falsification check of data according to claim 1, the data recording device comprising: a sensor configured to obtain an analog signal; an A/D converter configured to convert the analog signal obtained by the sensor into digital data; and a processor, wherein the processor performs:

Step Sa2 of computing a hash value using a hash function for only the signal data or for the whole digital data except the hash value;

Step Sa3 of encrypting the hash value with either of a secret key or a public key; and Step Sa4 of writing the encrypted hash data into a noise area where noise data is recorded.

8. The method for executing the falsification check of data according to claim 2, wherein data other than the encrypted hash value is included in a part of the noise area.

9. The method for executing the falsification check of data according to claim 2, wherein data for a plurality of samples among the digital data output from the A/D converter is handled as one data unit.

10. The method for executing the falsification check of data according to claim 2, wherein the data other than the encrypted hash value includes a conversion constant between the signal data and a physical quantity represented by the analog signal obtained by the sensor.

11. The data recording device for performing the method for executing the falsification check of data according to claim 2, the data recording device comprising: a sensor configured to obtain an analog signal; an A/D converter configured to convert the analog signal obtained by the sensor into digital data; and a processor, wherein the processor performs:

Step Sa2 of computing a hash value using a hash function for only the signal data or for the whole digital data except the hash value;

Step Sa3 of encrypting the hash value with either of a secret key or a public key; and Step Sa4 of writing the encrypted hash data into a noise area where noise data is recorded.

\* \* \* \* \*